(No Model.)
W. G. HOUK.
HAY AND STRAW RACK.
No. 332,530. Patented Dec. 15, 1885.
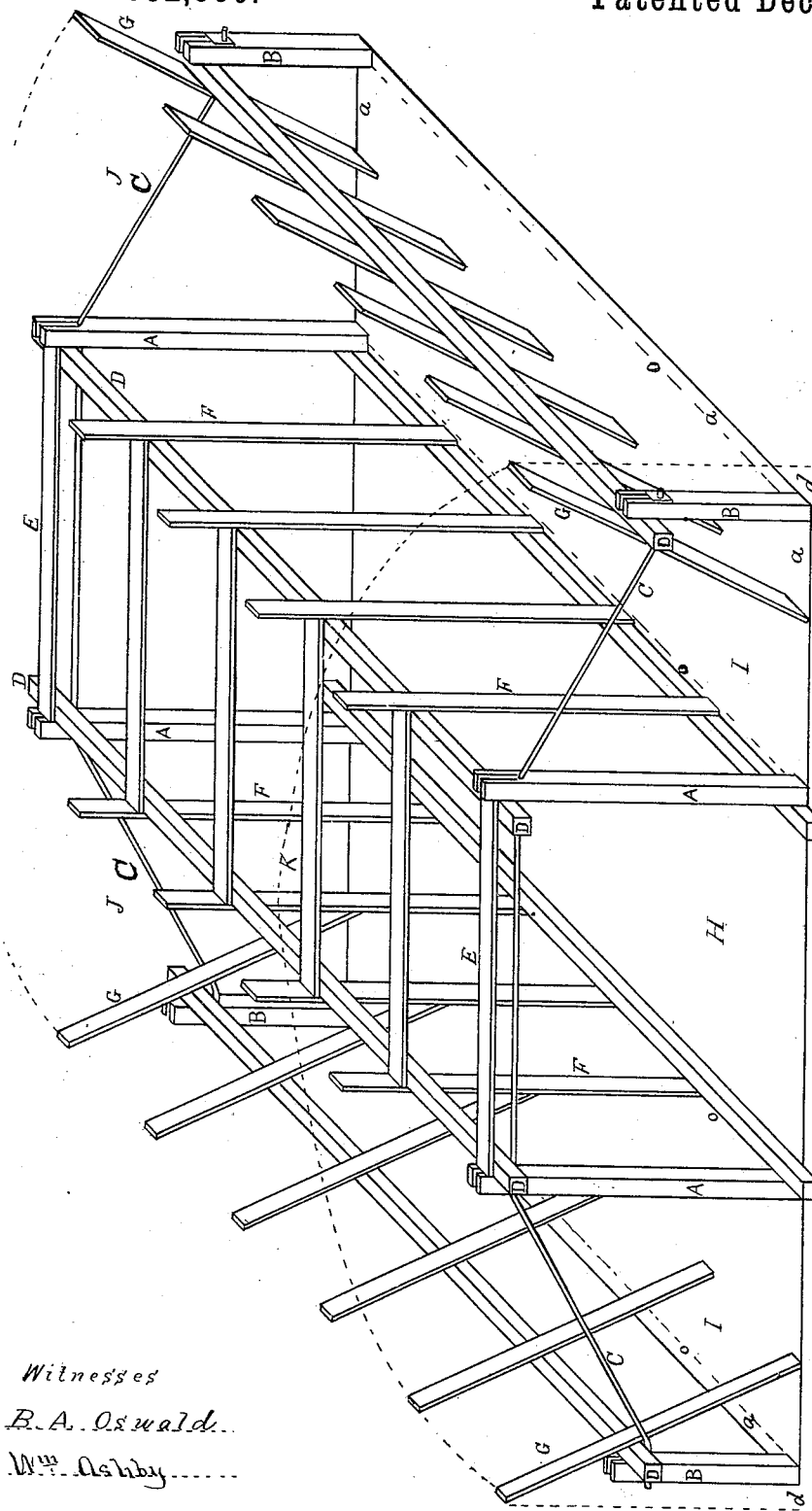
Witnesses
B. A. Oswald
Wm Ashby
Inventor
W. G. Houk
Attorney

UNITED STATES PATENT OFFICE.

WILBUR GIBBENS HOUK, OF LAFAYETTE, INDIANA.

HAY AND STRAW RACK.

SPECIFICATION forming part of Letters Patent No. 332,530, dated December 15, 1885.

Application filed March 2, 1885. Serial No. 157,560. (No model.)

*To all whom it may concern:*

Be it known that I, WILBUR GIBBENS HOUK, a citizen of the United States, residing at Lafayette, in the county of Tippecanoe and State of Indiana, have invented a new and useful Hay and Straw Rack, of which the following is a specification.

My invention relates to hay and straw racks in which the downward and lateral pressure or weight of the contents renders the rack strong and self-supporting, as is hereinafter explained.

The object of my invention is, first, to provide a good preservative manner of ricking hay and straw; second, to form with the hay and straw good, warm, and convenient stock-shelter; third, to provide a rack from which stock can feed while sheltered. I attain these objects by the use of a rack and shelter constructed as shown in the accompanying drawing, which is a perspective view of my device, and consists of the inner posts, A A, of height sufficient to form an elevated basis for the straw or hay, and thus produce a stock-shelter, and the outer posts, B B, of lesser height, forming in connection with the posts A and the connecting rods or stays C the feeding spaces or mangers, while the surface within between the posts B B and A A constitutes the external or ground base of the rick. The rods or stays C, which pass through slots in the top end of posts A A, and with the proper angles extending to and passing through the top ends of posts B B, and firmly secured by means of a nut or pin, constitute the main stay of the rack by keeping it from spreading or being pulled apart by the lateral weight or pressure that is produced when the rack is filled, as is hereinafter explained. The beams or supports D, which rest upon the stays C and against the inner part of that portion of the posts A and B which extends above the stay c, constitute the bearings or supports for the timbers E, F, and G, which are hereinafter explained. The joists E, the supports for the hay or straw which occupy that portion of space above them, K, as indicated by the oval dotted lines, constitute the roof of the main stock-shed H. The uprights F prevent the hay or straw which occupies that portion of the space opposite them, I, from falling into the main stock-shed H, and therewith constituting the walls of the stock-shed H. The stakes G may stand at any angle desired, so that the lower end will rest upon the surface of the base within the lines of the inner and outer ranges of posts A and B, as is indicated by the dotted lines O. The upper ends of stakes G may extend to any distance desired above their supports D, and thereby, when filled with hay or straw, form a stock-shelter by projecting over, as is indicated by the dotted line d. The stakes G standing in this position when the lower part of space I is filled with hay or straw, the downward weight or pressure produces a lateral weight or pressure against the two outer beams, D. This lateral pressure on each side being in opposite directions, the weight upon one side acts as a brace to that upon the other, and in so doing gives strength and self-support to the rack, and when the upper part of the space J is filled with hay or straw its weight upon the upper ends of stakes G has a tendency to balance said stakes upon their supports D, thereby increasing the lateral weight or pressure against the beams D; but the weight upon the lower part of stakes G increasing more rapidly as the rack is filled than the weight upon the upper part, and thereby counterbalancing it, and in so doing it holds or throws the line of weight or gravity toward the center of the main base of the rack, as well as possessing the bracing principle just explained, and in both instances giving strength and self-support to the rack. The lower part of the space I, which is to be filled with hay or straw, in order to bring a great portion of the direct or downward weight to the lowest possible point within the base and as near the center as can be, and form the walls of stock-shed H, also gives strength and self-support to the entire structure, as well as placing the hay or straw in a position from which stock can feed while sheltered in the main stock-shed H, and under the projecting shed formed by the upper ends of stakes G, as is indicated by the dotted lines d, the feed being supplied from the upper part of the space J, all of which is purposed and attained in the construction.

I claim as my invention and desire to secure by Letters Patent—

1. A hay or straw rack and rick frame consisting of the inner posts, A A, the outer posts, B B, the braces or main stays C, beams D, uprights F, cross-bars E, and the inclined bars G, all constructed and arranged substantially as described.

2. A combined shelter and feed-rack consisting of a stock-apartment formed by the timbers A D E F, and the racks and mangers exterior thereto, formed by the posts A and uprights F, and the outer posts, B, and the inclined slips G, the whole structure being braced and secured by the stays C, passing through slots in the posts A, and secured in the posts B, all as shown and described.

3. A combined stock shelter and rack constructed as described, and consisting of inner posts, A, outer posts, B, lateral beams D, stays or braces C, and timbers E F G, and having feeding-spaces I between the inner and outer posts, said rack and shelter being roofed and walled by building a rick of hay or straw in the spaces I I and over the frame-work A D E, all as described.

WILBUR GIBBENS HOUK.

Witnesses:
D. E. STUDEBAKER,
O. M. MITCHELL.